(12) United States Patent
Ashida (10) Patent No.: US 11,127,289 B2
(45) Date of Patent: Sep. 21, 2021

(54) TRAFFIC CONGESTION ESTIMATING DEVICE, TRAFFIC CONGESTION ESTIMATING METHOD, AND RECORDING MEDIUM STORING PROGRAM THEREOF

(71) Applicant: NEC CORPORATION, Tokyo (JP)

(72) Inventor: Yuta Ashida, Tokyo (JP)

(73) Assignee: NEC CORPORATION, Tokyo (JP)

( * ) Notice: Subject to any disclaimer, the term of this patent is extended or adjusted under 35 U.S.C. 154(b) by 83 days.

(21) Appl. No.: 16/495,936

(22) PCT Filed: Mar. 19, 2018

(86) PCT No.: PCT/JP2018/010764
§ 371 (c)(1),
(2) Date: Sep. 20, 2019

(87) PCT Pub. No.: WO2018/180688
PCT Pub. Date: Oct. 4, 2018

(65) Prior Publication Data
US 2020/0143672 A1 May 7, 2020

(30) Foreign Application Priority Data
Mar. 31, 2017 (JP) .............................. JP2017-070451

(51) Int. Cl.
*G08G 1/065* (2006.01)
*G08G 1/01* (2006.01)
(Continued)

(52) U.S. Cl.
CPC ......... *G08G 1/065* (2013.01); *G01C 21/3492* (2013.01); *G08G 1/0133* (2013.01); *G08G 1/052* (2013.01)

(58) Field of Classification Search
CPC ...... G08G 1/065; G08G 1/0133; G08G 1/052; G08G 1/0141; G08G 1/0145;
(Continued)

(56) References Cited

U.S. PATENT DOCUMENTS 6,587,779 B1 * 7/2003 Kerner ................. G08G 1/0104
340/909
2010/0286899 A1  11/2010 Jain et al.
(Continued)

FOREIGN PATENT DOCUMENTS

JP     2001-188987 A    7/2001
JP     2010-44526 A     2/2010
(Continued)

OTHER PUBLICATIONS

International Search Report for PCT/JP2018/010764 dated Jun. 26, 2018 [PCT/ISA/210].
(Continued)

*Primary Examiner* — Brian Wilson
(74) *Attorney, Agent, or Firm* — Sughrue Mion, PLLC (57) ABSTRACT

A traffic congestion estimating device includes: a traffic congestion starting point and end point identifying unit that identifies a traffic congestion end point and a traffic congestion starting point for defining a traffic congestion area, based on position information detected for each vehicle; an inflow/outflow estimation unit that estimates an inflow to the traffic congestion end point at every time period, as well as, an outflow from the traffic congestion starting point at that time period, based on a traffic volume that was measured by a sensor on the upstream side of the traffic congestion end point, a traffic volume that was measured by a sensor on the downstream side of the traffic congestion starting point, and the position information; and a traffic congestion area updating unit that updates the traffic congestion end point, based on the inflow, and updates the traffic congestion starting point, based on the outflow.

8 Claims, 7 Drawing Sheets

(51) Int. Cl.
*G08G 1/052* (2006.01)
*G01C 21/34* (2006.01)

(58) Field of Classification Search
CPC .. G08G 1/0116; G08G 1/0104; G08G 1/0112; G08G 1/096791; G08G 1/096844; G08G 1/096775; G01C 21/3492; G06G 7/76
See application file for complete search history.

(56) References Cited

U.S. PATENT DOCUMENTS

| | | | | |
|---|---|---|---|---|
| 2015/0262477 A1* | 9/2015 | Fowe | ............... | G08G 1/096716 701/118 |
| 2016/0247397 A1* | 8/2016 | Xu | ....................... | G08G 1/0141 |
| 2017/0330458 A1* | 11/2017 | Jordan | ................ | G08G 1/0133 |
| 2017/0352262 A1* | 12/2017 | Xu | ....................... | G08G 1/0112 |

FOREIGN PATENT DOCUMENTS

| | | |
|---|---|---|
| JP | 2017-49951 A | 3/2017 |
| WO | 2015/045695 A1 | 4/2015 |

OTHER PUBLICATIONS

Written Opinion for PCT/JP2018/010764 dated Jun. 26, 2018 [PCT/ISA/237].

* cited by examiner

Fig.3

| SENSOR_ID | TIME | TRAFFIC VOLUME | VEHICLE DENSITY | POINT SPEED |
|---|---|---|---|---|
| Sx | Tx | qx | Kx | Vx |
| Sy | Ty | qy | Ky | Vy |
| ... | ... | | ... | |

Fig.4

| GPS_CAR_ID | TIME STAMP | POSITION INFORMATION | SPEED |
|---|---|---|---|
| PA | 2017/3/30 09:24 | 43° 03′ 51″ N 141° 20′ 49″ E | $v_1$ |
| ⋮ | ⋮ | ⋮ | ⋮ |
| PB | 2017/3/30 09:24 | 43° 03′ 51″ N 141° 20′ 50″ E | $v_2$ |
| ⋮ | ⋮ | ⋮ | ⋮ |

| TRAFFIC CONGESTION ID | TRAFFIC CONGESTION STARTING POINT | TRAFFIC CONGESTION END POINT | TRAFFIC CONGESTION LENGTH | TIME |
|---|---|---|---|---|
| TJ1 | $Kp_{x1}$ | $Kp_{x2}$ | $D_{x12}$ | $T_x$ |
| TJ2 | $Kp_{y1}$ | $Kp_{y2}$ | $D_{y12}$ | $T_y$ |
| ... | ... | | ... | |

Fig.7

TRAFFIC CONGESTION ESTIMATING DEVICE, TRAFFIC CONGESTION ESTIMATING METHOD, AND RECORDING MEDIUM STORING PROGRAM THEREOF

CROSS REFERENCE TO RELATED APPLICATIONS

This application is a National Stage of International Application No. PCT/JP2018/010764, filed on Mar. 19, 2018, which claims priority from Japanese Patent Application No. 2017-070451, filed on Mar. 31, 2017, the contents of all of which are incorporated herein by reference in their entirety.

TECHNICAL FIELD

The present disclosure relates to a traffic congestion estimating device and the like.

BACKGROUND ART

For a road management entity, measuring and monitoring traffic conditions at each point of a road is important for controlling road safety and maintaining road quality. Especially in highways, identifying the starting point (head) and end point (trail) of occurring traffic congestion is important for controlling a traffic volume or planning extension and widening of the road. To that end, a traffic control system, where a variety of measuring instruments (sensors) are installed on roads, from which information is collected and utilized, has been established.

As for the measuring instrument, a loop coil type vehicle detector, a vehicle detector that recognizes a vehicle by image-processing a captured image by a closed-circuit television (CCTV) camera, a vehicle detector using ultrasound, an optical vehicle detector, or the like is used.

However, such monitoring of traffic conditions using stationary sensors requires not only the stationary sensors but also a processing device for processing information from the stationary sensors, as well as, a communication line between the processing device and the traffic control system, installation of which is costly. For this reason, it is unfeasible to deploy stationary sensors on all road segments, and stationary sensors are often deployed only on important road segments such as road segments where traffic congestion tends to occur. Whereas, even for road segments other than important road segments, when an accident or irregular traffic congestion occurs, understanding of the situation becomes necessary for a safety control purpose, however, monitoring such road segments is difficult under the current circumstances.

As traffic condition measurement without using stationary sensors, traffic condition measurement using global positioning system (GPS) in-vehicle devices has been considered. The benefits of the traffic condition measurement using GPS, include a low cost burden for a road management entity and capability of measuring traffic conditions even at points where stationary sensors are not deployed.

On the other hand, the traffic condition measurement using GPS has the following disadvantages: For example, the traffic conditions cannot be measured when no vehicles equipped with GPS in-vehicle devices run on the roads. This causes large polarization of measurement points of traffic conditions depending on time and areas. In addition, due to the influence of GPS errors, measurement errors tend to increase especially in a city center where signals of satellites are hard to be detected. Even if the driving speed and traveling time of a GPS equipped vehicle can be measured, information of the road segment as a whole, for example, the average driving speed and the number or density of passing vehicles, cannot be recognized.

In light of such situations, a technique for estimating a traffic congestion area that changes as time passes by combining traffic condition measurement by the above-described stationary sensors and traffic condition measurement by GPS has been considered.

PTL 1 discloses, mainly in a case where there is a branch road between intersections of a local road where the inflow and outflow of vehicles cannot be measured, a method of estimating the number of vehicles that are remaining between the intersections. In the estimation method of PTL 1, the number of vehicles existing in a road segment that cannot be measured is estimated using a difference of the numbers of passing vehicles between two intersections where sensors are installed, i.e., between an inflow intersection and an outflow intersection, and correction coefficients indicating the ratios of the outflow to and inflow from an unknown branch road.

Moreover, PTL 1 also discloses a method of improving the precision of the correction coefficients using GPS information when updating the correction coefficients. As described above, the correction coefficient represents the inflow/outflow ratio of an unmeasured branch road, and the method described in PTL 1 updates the correction coefficient at a specific cycle using past measurement data. With regard to this update, the update is made based on the proportion of the number of passing vehicles at the inflow intersection to the number of passing vehicles at the outflow intersection, where the traffic volume measured at the outflow intersection is correlated to the inflow traffic volume that has been measured in the past time period, instead of the inflow data measured at the same time as the outflow data. It is preferable to adjust the measurement time at the inflow side and outflow side while taking into account of the travel time of vehicles and, based on the traffic flow, estimate the outflow and inflow of an unmeasured branch road. As such, GPS information is used to measure travel time of vehicles, and, based on the travel time, the measurement time of the number of passing vehicles on the outflow side and the number of passing vehicles on the inflow side is appropriately adjusted.

PTL 2 also discloses a method of estimating a traffic condition at an unmeasured point by combining information measured by a stationary sensor and information measured by GPS. PTL 2 focuses on speed as a measuring and estimating target. Specifically, using speed measured by GPS as training data, a method of estimating highly precise speed information at arbitrary time from information by a stationary sensor by regression analysis using the speed measured by the stationary sensor as an explanatory variable and the speed measured by GPS as a response variable is disclosed. In this method, stationary sensor information at a different point may also be used as the explanatory variable, and GPS measurement information in a sensor-uninstalled segment may also be used as the response variable.

PTL 3 also discloses a method of improving measurement precision of the end point of traffic congestion by combining information measured by GPS in addition to the traffic congestion end point information measured by a stationary sensor. The method of PTL 3 collects vehicle position information measured by GPS and estimates that vehicles with not more than a certain inter-vehicular distance exist in the traffic congestion area. Then, the method of PTL 3 measures a change in the traffic congestion end point even in a segment without a stationary sensor by considering a point in the most upstream of the estimated traffic congestion area as a traffic congestion end point.

CITATION LIST

Patent Literature

[PTL 1] International Publication No. WO 2015/045695
[PTL 2] U.S. Unexamined Patent Application Publication No.
[PTL 3] Japanese Unexamined Patent Application Publication No. 2001-188987

SUMMARY OF INVENTION

Technical Problem

The technique disclosed in PTL 1 can estimate a residual ratio of vehicles in an unmeasured road segment while taking into account the road travel time measured by GPS. This method can be applied in the similar way to highways by considering the on-ramps and off-ramps as branch roads. However, the method of PTL 1 has a premise that a traffic volume per unit time measured at a sensor-installed point is evenly allocated in a sensor-uninstalled segment, except for the outflow to/inflow from branch roads. Thus, when a sensor-uninstalled segment spreads over a long distance, such as highways in mountains, the traffic volume becomes uneven depending on positions due to difference in the average speed of each vehicle, which lowers estimation precision of a traffic volume and estimation precision of traffic congestion.

The technique of PTL 2 establishes a regression model for estimating a value at an unmeasured point in line with the measurement by GPS. However, since this model is constructed using GPS information as training data, the number of points where values cannot be estimated increases when GPS information is insufficient, which makes identification of traffic congestion difficult.

The technique of PTL 3 also estimates a change in traffic congestion in a sensor-uninstalled segment, based only on measurement by GPS. Thus, precision of estimating the traffic congestion is lowered unless in an environment where GPS data can be collected finely in terms of time and space.

The objective of the present disclosure is to provide a traffic congestion estimating device and the like that can improve the precision of identifying the starting point and end point of a traffic congestion area even in a sensor-uninstalled segment.

Solution to Problem

One aspect of a traffic congestion estimating device according to the present disclosure includes: a traffic congestion starting point and end point identifying unit that identifies a traffic congestion end point and a traffic congestion starting point for defining a traffic congestion area, based on position information detected for each vehicle; an inflow/outflow estimation unit that estimates an inflow to the traffic congestion end point at every time period, as well as, an outflow from the traffic congestion starting point at that time period, based on a traffic volume that was measured by a sensor on the upstream side of the traffic congestion end point, a traffic volume that was measured by a sensor on the downstream side of the traffic congestion starting point, and the position information; and a traffic congestion area updating unit that updates the traffic congestion end point, based on the inflow, and updates the traffic congestion starting point, based on the outflow.

One aspect of a traffic congestion estimating method according to the present disclosure includes: identifying a traffic congestion end point and a traffic congestion starting point for defining a traffic congestion area, based on position information detected for each vehicle; estimating an inflow to the traffic congestion end point at every time period, as well as, an outflow from the traffic congestion starting point at that time period, based on a traffic volume that was measured by a sensor on the upstream side of the traffic congestion end point, a traffic volume that was measured by a sensor on the downstream side of the traffic congestion starting point, and the position information, and updating the traffic congestion end point, based on the inflow, and updating the traffic congestion starting point, based on the outflow.

One aspect of a program stored in a recording medium according to the present disclosure, the program causes a computer to execute:
identifying a traffic congestion end point and a traffic congestion starting point for defining a traffic congestion area, based on position information that was detected for each vehicle;
estimating an inflow to the traffic congestion end point at every time period, as well as, an outflow from the traffic congestion starting point at that time period, based on a traffic volume that was measured by a sensor on the upstream side of the traffic congestion end point, a traffic volume that was measured by a sensor on the downstream side of the traffic congestion starting point, and the position information, and
updating the traffic congestion end point, based on the inflow, and updating the traffic congestion starting point, based on the outflow.

Advantageous Effects of Invention

The present disclosure can improve the precision of identifying the starting point and end point of a traffic congestion area even in a sensor-uninstalled segment.

EXAMPLE EMBODIMENT

Figure 1:
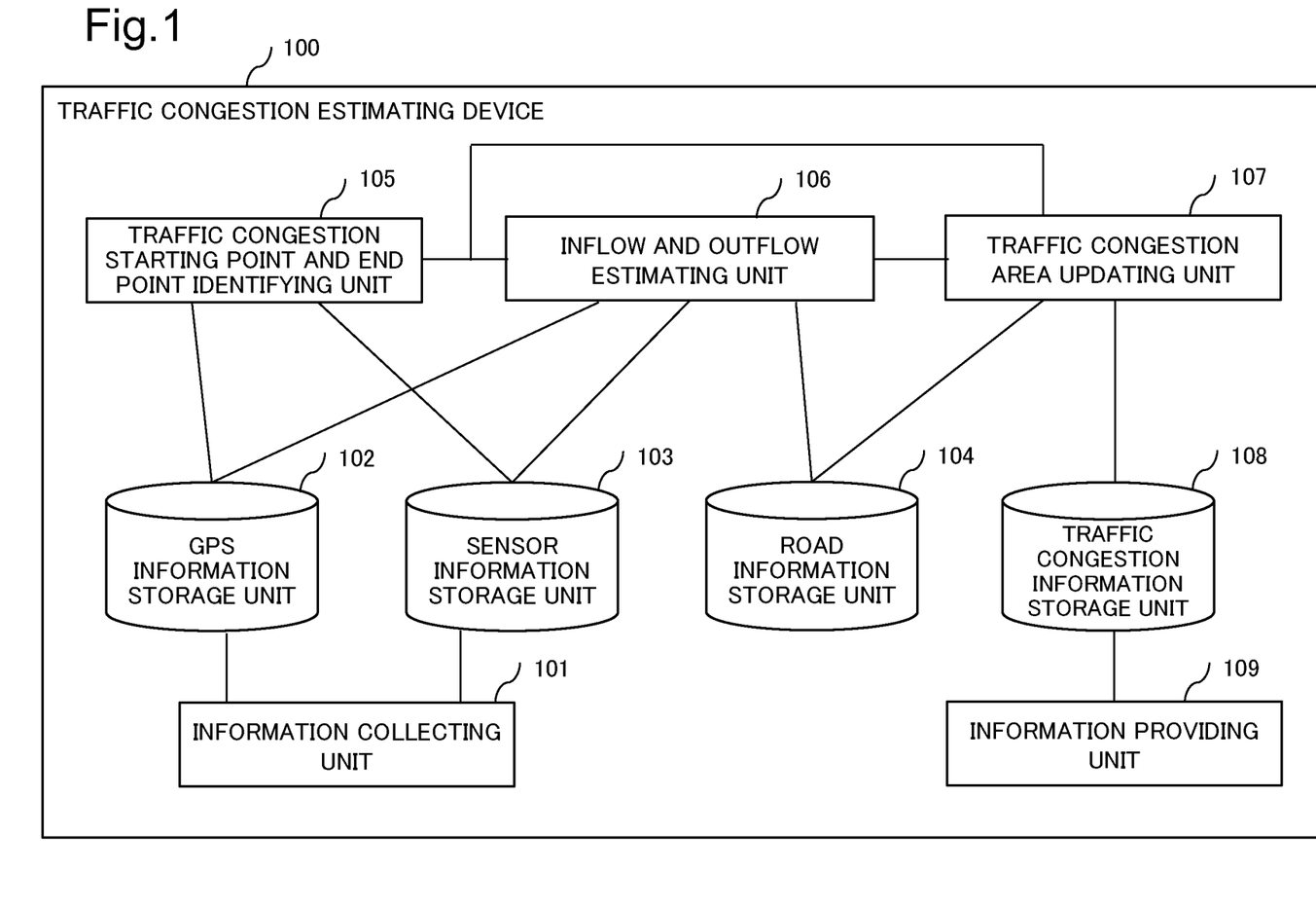
FIG. 1 is a block view illustrating a configuration of a traffic congestion estimating device of a first example embodiment.

A traffic congestion estimating device of a first example embodiment will be described with reference to the drawings. FIG. 1 is a block view illustrating a configuration of the traffic congestion estimating device of the first example embodiment. The traffic congestion estimating device 100 illustrated in FIG. 1 includes: an information collecting unit 101, a GPS information storage unit 102, a sensor information storage unit 103, a road information storage unit 104, a traffic congestion starting point and end point identifying unit 105, an inflow and outflow estimating unit 106, a traffic congestion area updating unit 107, a traffic congestion information storage unit 108, and an information providing unit 109.

The information collecting unit 101 collects traffic information that was measured using GPS from a GPS in-vehicle device equipped in a vehicle, a mobile phone terminal, etc. (hereinafter, also referred to as the "GPS information") and causes the GPS information storage unit 102 to store the traffic information. The GPS information is, for example, position information of a driving vehicle with a time stamp.

The information collecting unit 110 also collects traffic information measured by a sensor installed on a road (hereinafter, also referred to as the "sensor information") and causes the sensor information storage unit 123 to store the traffic information. The sensor information is, for example, a vehicle speed, a traffic volume, a cross traffic volume, traffic density, or the like measured in a road segment where a sensor is installed (hereinafter, also referred to as a sensor-installed road segment). The sensor-installed road segment is, for example, highways, intersections, important roads, or the like.

The traffic volume represents the number of vehicles passing through a certain point of a road per unit time (the number of passing vehicles). The cross traffic volume represents a traffic volume of vehicles passing through an assumed cross section between two points. The traffic density represents the number of vehicles, such as automobiles, exist in a unit segment of a road or a space and time occupancy rate of the vehicles on a road.

Note that the information collecting unit 101 may receive vehicle position information directly from a GPS equipped vehicle and create GPS information. Alternatively, the information collecting unit 101 may collect GPS information created by an external device (not illustrated) and cause the GPS information storage unit 102 to store the GPS information.

Further, the information collecting unit 101 may directly receive vehicle speed or the like measured by a sensor from the sensor or directly collect from a primary processing device that is directly connected to the sensor. In addition, the information collecting unit 101 may collect and cause to store information that was collected and processed by other device such as a traffic control device.

The road information storage unit 104 stores information relating to a road structure such as road connection information and road segment distances in a road network.

The traffic congestion starting point and end point identifying unit 105 identifies the traffic congestion end point and congestion starting point for defining a traffic congestion area, based on the position information detected for each vehicle. Specifically, the traffic congestion starting point (head) and congestion end point (trail) of an initial traffic congestion area are identified based on the GPS information and sensor information. The traffic congestion starting point and end point identifying unit 105 causes the storage device (not illustrated) to store the identified congestion starting point and congestion end point. Note that the GPS information storage unit 102 or the sensor information storage unit 103 may store the traffic congestion starting point or congestion end point.

The inflow and outflow estimating unit 106 estimates an inflow to the traffic congestion end point at every time period, as well as, an outflow from the traffic congestion starting point at every time period, based on the traffic volume that was measured by a sensor on the upstream side of the traffic congestion end point and the traffic volume that was measured by a sensor on the downstream side of the traffic congestion starting point and the position information. The inflow and outflow estimating unit 106 causes the storage device (not illustrated) to store the estimated inflow and outflow. The details of the inflow and outflow estimating unit 106 will be specifically described in relation to the operation of the traffic congestion estimating device.

The traffic congestion area updating unit 107 updates the traffic congestion end point, based on the inflow estimated by the inflow and outflow estimating unit 106, and updates the congestion starting point, based on the outflow estimated by the inflow and outflow estimating unit 106. Further, the traffic congestion area updating unit 107 updates the extension of the traffic congestion area, based on a difference between the inflow and outflow estimated by the inflow and outflow estimating unit 106. The traffic congestion area updating unit 107 causes the traffic congestion information storage unit 108 to store updated traffic congestion area information.

The traffic congestion information storage unit 108 stores the time change information of traffic congestion estimated by the traffic congestion area updating unit 107. The information providing unit 109 provides the traffic congestion information stored in the traffic congestion information storage unit 108 to an external device (not illustrated).

Next, the operation of the traffic congestion estimating device of the first example embodiment will be described with reference to the drawings. First, the entire operation of the traffic congestion estimating device will be described.

Figure 2:
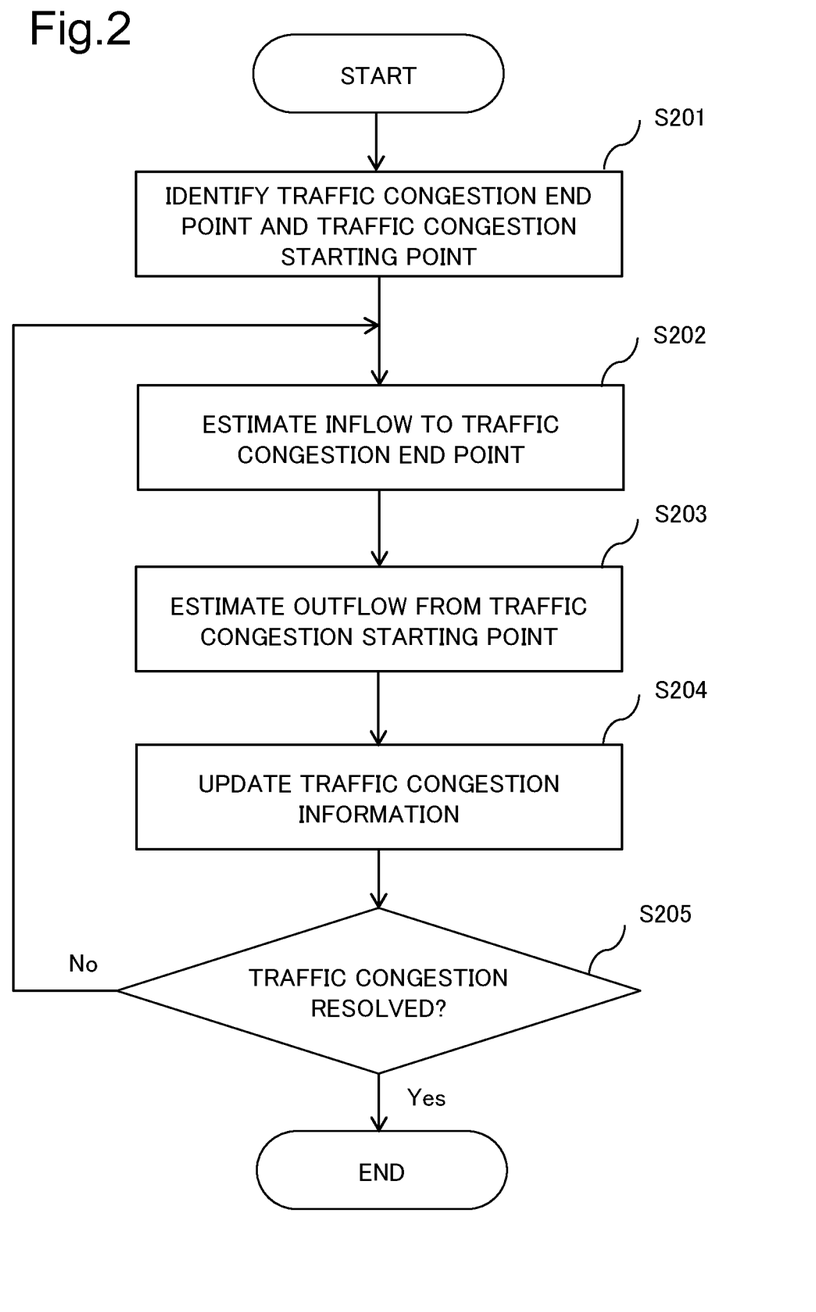
FIG. 2 is a flowchart illustrating an operation of the traffic congestion estimating device of the first example embodiment.

FIG. 2 is a flowchart illustrating the operation of the traffic congestion estimating device of the first example embodiment.

The traffic congestion starting point and end point identifying unit 105 identifies the traffic congestion end point and congestion starting point for defining a traffic congestion area, based on the position information detected for each vehicle (step S201).

The inflow and outflow estimating unit 106 estimates an inflow to the traffic congestion end point at every time period (step S202), as well as, estimates an outflow from the traffic congestion starting point at every time period (step S203), based on the traffic volume that was measured by a sensor on the upstream side of the traffic congestion end point and the traffic volume that was measured by a sensor on the downstream side of the traffic congestion starting point and the position information.

The traffic congestion area updating unit 107 calculates the extension of the traffic congestion end point, based on the estimated inflow and outflow, the number of road lanes between sensor-installed points, and the average vehicle length, and updates the traffic congestion information (step S204). At this time, when the traffic congestion has been resolved as the result of updating the traffic congestion information (Yes at step S205), the processing ends. When the traffic congestion has not been resolved (No at step S205), the processing of step S202 continues.

The following will describe the details of the processing at each step.

The processing of identifying the traffic congestion end point and congestion starting point of the initial traffic congestion area by the traffic congestion starting point and end point identifying unit 105 (step S201) will be described.

The identification processing for identifying the initial traffic congestion area is either identification processing that uses both sensor information and GPS information or identification processing that uses GPS information. The identification processing that uses both sensor information and GPS information will be first described.

The traffic congestion starting point and end point identifying unit 105 identifies traffic congestion points detectable by sensor information using sensor information stored in the sensor information storage unit 103 (hereinafter, referred to as the sensor traffic congestion points). The sensor traffic congestion point is, for example, a point where the average speed of vehicles measured by a sensor is not more than a certain value or a point where the traffic density is not less than a certain value.

Figure 3:
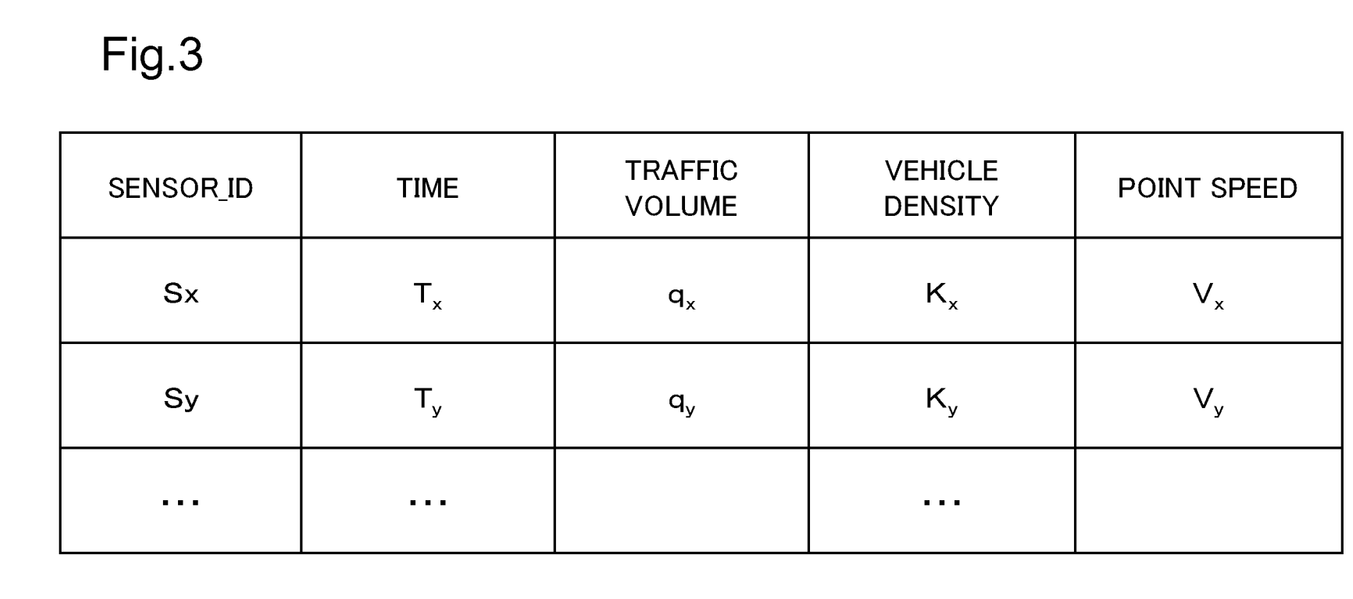
FIG. 3 is a datasheet illustrating an example of sensor information of the first example embodiment.

FIG. 3 is an example of sensor information stored in the sensor information storage unit 103. The sensor information illustrated in FIG. 3 includes a sensor ID, time, a traffic volume, vehicle density, and point speed. The sensor ID is an identifier for identifying a fixed sensor installed on a road. The time is the measurement time of the sensor.

The traffic volume is the number of vehicles per unit time that was measured at a certain time period by the sensor (the number of vehicles passing through the sensor). The vehicle density is the number of vehicles per unit length. The point speed is the average vehicle speed of vehicles at a sensor-installed point.

Figure 4:
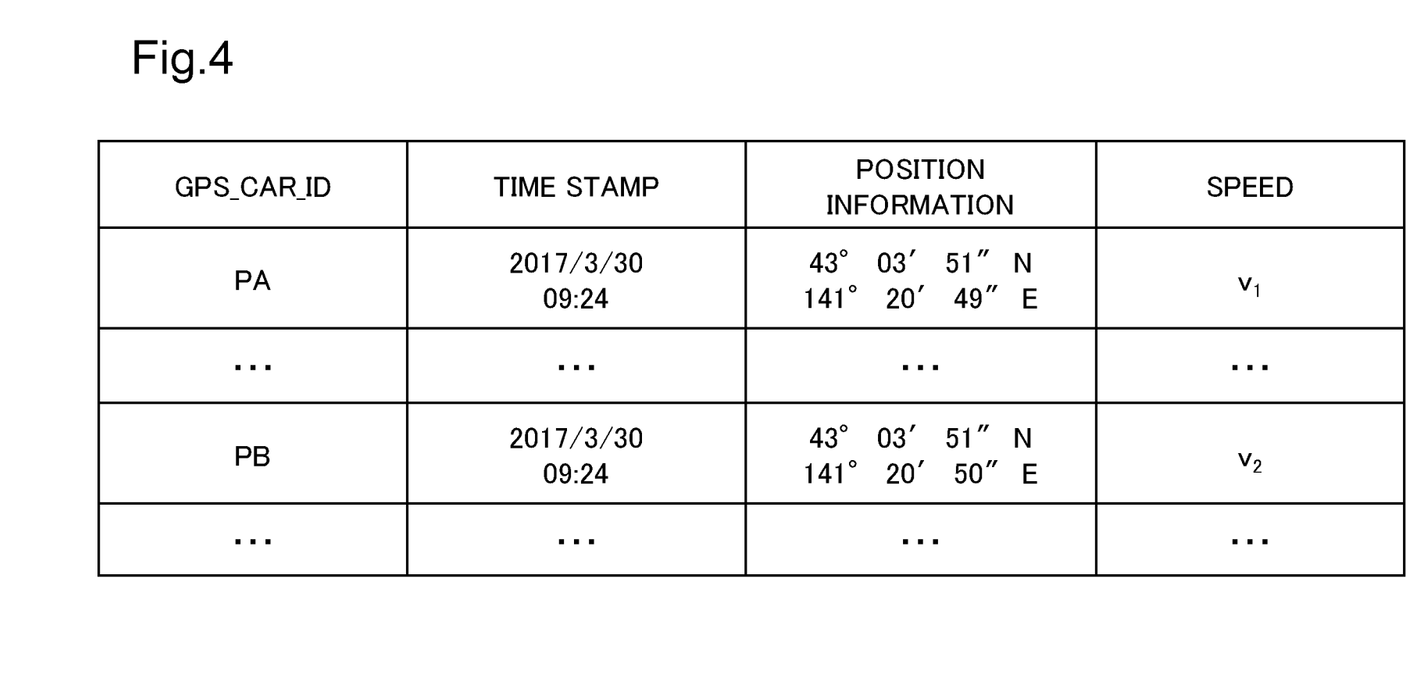
FIG. 4 is a datasheet illustrating an example of GPS information of the first example embodiment.

FIG. 4 is an example of GPS information stored in the GPS information storage unit 102. The GPS information illustrated in FIG. 4 includes GPS_CAR_ID, a time stamp, position information, and speed. The GPS_CAR_ID is an identifier for identifying a GPS equipped vehicle. The time stamp includes time and date when the GPS equipped vehicle performed GPS positioning of a vehicle. The position information is the vehicle position obtained by GPS positioning. The speed is the vehicle speed of the GPS equipped vehicle. Note that the vehicle trajectory can be represented as, for example, a collection of position information of a GPS equipped vehicle between a certain sensor-installed point and the next sensor-installed point.

When sensor traffic congestion points consecutively appear, the traffic congestion starting point and end point identifying unit 105 combines the segments of the consecutive sensor traffic congestion points and derives the segments as a traffic congestion area (sensors). Further, the traffic congestion starting point and end point identifying unit 105 acquires vehicle trajectories of GPS equipped vehicles that have passed this traffic congestion area (sensors) (trajectory information) from the GPS information storage unit 102. The traffic congestion starting point and end point identifying unit 105 derives an area in which the average speed of GPS equipped vehicles is not more than a certain value as a traffic congestion area (sensors+GPS), based on the acquired vehicle trajectories.

When there is an area where the average speed of the GPS equipped vehicles is not more than a certain value on the upstream side or downstream side of the traffic congestion area (sensors+GPS), the traffic congestion starting point and end point identifying unit 105 updates the traffic congestion area by further adding such an area to the traffic congestion area (sensors+GPS). Note that the vehicle driving direction is assumed to be directed from upstream to downstream.

The traffic congestion starting point and end point identifying unit 105 identifies this updated traffic congestion area (sensors+GPS) as an initial traffic congestion area. The ends of the initial traffic congestion area (positions where the average speed of the GPS equipped vehicles is not more than a certain value) are respectively the traffic congestion starting point of the initial traffic congestion area and the traffic congestion end point of the initial traffic congestion area.

Note that the initial traffic congestion area can be identified using the GPS information without using sensor information. The traffic congestion starting point and end point identifying unit 105 acquires vehicle trajectories of GPS equipped vehicles from the GPS information storage unit 102 and derives an area in which the average speed of the GPS equipped vehicles is not more than a certain value as a traffic congestion area (GPS), based on the acquired vehicle trajectories without using the traffic congestion area (sensors). The traffic congestion starting point and end point identifying unit 105 identifies the traffic congestion area (GPS) as an initial traffic congestion area. The ends of the initial traffic congestion area are respectively the traffic congestion starting point of the initial traffic congestion area and the traffic congestion end point of the initial traffic congestion area.

Next, estimation of the inflow to the traffic congestion end point (step S202) and estimation of the outflow from the traffic congestion starting point (step S203) by the inflow and outflow estimating unit 106 will be described.

The inflow and outflow estimating unit 106 estimates the number of arriving vehicles per unit time, which is the number of vehicles arriving at the traffic congestion end point at every time period, as the inflow to the traffic congestion end point. In addition, the inflow and outflow estimating unit 106 estimates the number of departing vehicles per unit time, which is the number of vehicles departing from the traffic congestion starting point at every time period, as the outflow from the traffic congestion starting point.

Figure 5:
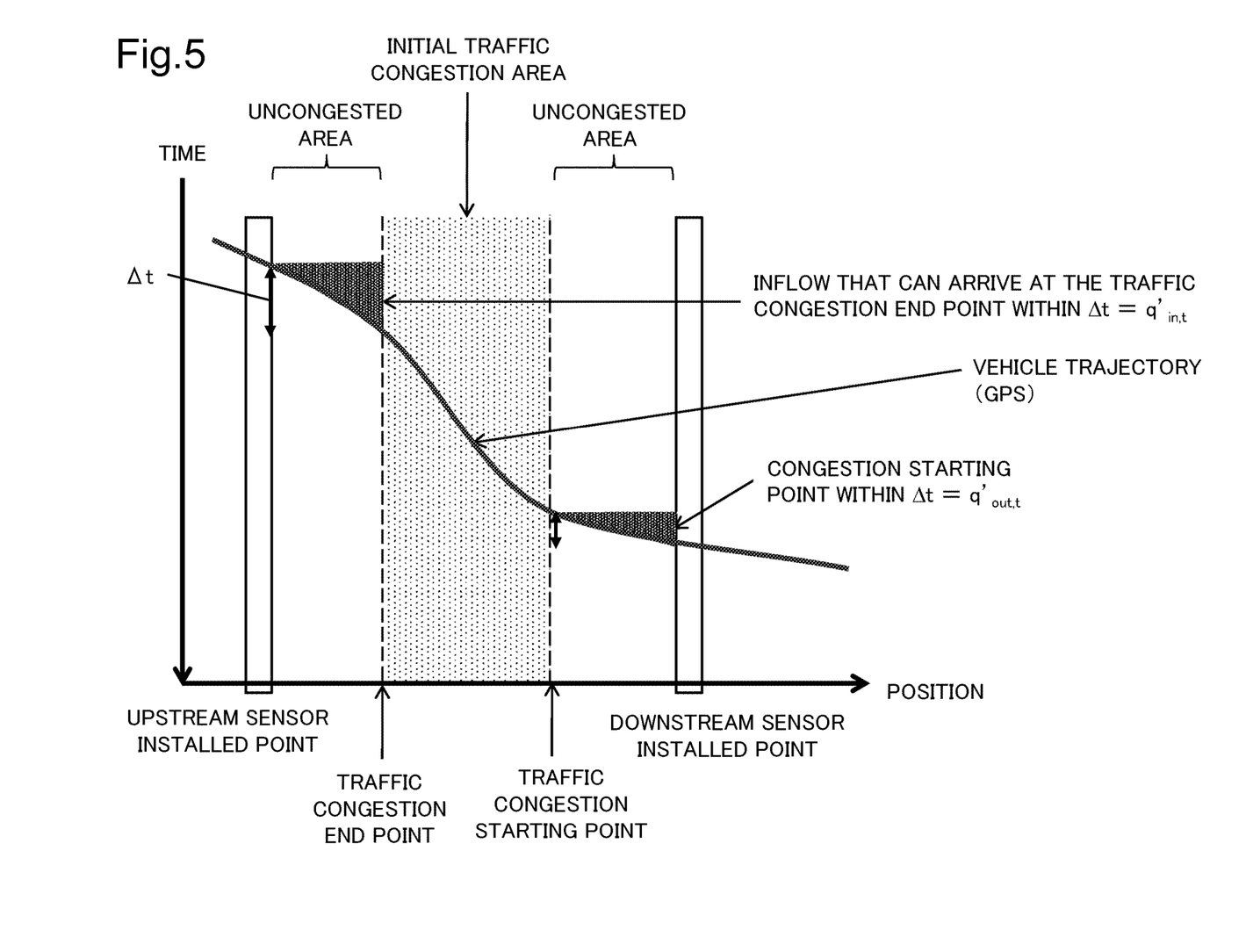
FIG. 5 is an explanatory view illustrating an initial traffic congestion area of a sensor-uninstalled segment in the first example embodiment.

FIG. 5 is an explanatory view illustrating an initial traffic congestion area of a sensor-uninstalled segment in the first example embodiment. In the example of FIG. 5, an initial traffic congestion area exists between an upstream sensor-installed point and a downstream sensor-installed point. In FIG. 5, between the upstream sensor-installed point and the traffic congestion end point, and between the downstream sensor-installed point and the traffic congestion starting point are uncongested areas.

Next, estimation of the inflow will be described. The traffic volume measured by an upstream sensor in the vicinity of the traffic congestion end point (the number of vehicles per unit time at the sensor-installed point) does not necessarily arrive at the traffic congestion end point with the same traffic volume. As the distance between the upstream sensor-installed point and the traffic congestion end point is longer, a change in the speed of vehicles that have passed the upstream sensor (also, referred to as the upstream-side sensor) affects the inflow estimation, and the ratio of vehicles arriving at the traffic congestion end point (arrival rate) varies according to the distance from the upstream sensor-installed point to the traffic congestion end point.

In addition, it is necessary to take into account that the residual vehicles that were previously measured by the upstream sensor, yet, have not arrived at the traffic congestion end point may arrive at the traffic congestion end point.

As such, the inflow and outflow estimating unit 106 estimates the inflow into the traffic congestion end point at every time period by the following equation (1).

$$q'_{in,t} = q_{in,t} \times (\Delta - d_{up,t-1}/v)/\Delta t \qquad (1)$$

wherein $q'_{in,t}$ indicates an inflow to the traffic congestion end point at time t (the number of arriving vehicles per unit time), $q_{in,t}$ indicates a traffic volume measured by an upstream sensor at time t (the number of vehicles passing through the sensor per unit time), $d_{up,t-1}$ indicates a distance from the upstream sensor-installed point to the traffic congestion end point at time t−1, v indicates the average speed of GPS equipped vehicles that have traveled from the upstream sensor-installed point to the traffic congestion end point, ($d_{up,t-1}$/v) indicates required time until a vehicle that has passed through the upstream sensor at time t−1 arrives at the traffic congestion end point, and Δt indicates a measurement time width of the upstream sensor.

Further, the second term of the equation (1), $q_{resid,t}$, indicates an inflow arriving at the traffic congestion end point at time t (the number of arriving vehicles per unit time) among the traffic volume that was measured by the upstream sensor prior to time t (the number of vehicles passing through the sensor per unit time).

In the equation (1), in certain measurement time, the vehicles that pass through the upstream sensor after the required time since the start of the measurement cannot arrive at the traffic congestion end point within the measurement time width of time t. For this reason, this required time is subtracted from the measurement time width of the upstream sensor and the outcome is divided by the measurement time width of the upstream sensor to obtain the arrival rate. Then, by multiplying the traffic volume measured by the upstream sensor at time t by the arrival rate, the arrival inflow of vehicles arriving at the traffic congestion end point (the number of arriving vehicles per unit time) can be estimated.

Moreover, $q_{resid,t}$ of the equation (1) is calculated by the following equation (2):

$$q_{resid,t} = \sum_i \left\{ (q_{in,t-i} - q'_{in,t-i}) \frac{i \times \Delta t - d_{up,t-i}/v}{i \times \Delta t} \right\} \quad (2)$$

$q_{in,t-i} - q'_{in,t-i}$ of the equation (2) indicates the residual number of vehicles remaining in an uncongested area at time step t−i.

The next term indicates the ratio of vehicles that can arrive at the traffic congestion end point at time t among the vehicles remaining in an uncongested area at time that is i prior to time t. The denominator indicates a time width available for vehicles remaining in the uncongested area, and the numerator indicates time obtained by subtracting the average time of vehicles traveled to the traffic congestion end point from the available time width.

The inflow and outflow estimating unit 106 estimates the number of arriving vehicles per unit time, which is the number of vehicles arriving at the traffic congestion end point at every time period, as the inflow to the traffic congestion end point from the equations (1) and (2). The inflow and outflow estimating unit 106 causes the storage device (not illustrated) to store the estimated inflow to the traffic congestion end point.

Next, estimation of the outflow will be described. Likewise, for the outflow from the traffic congestion starting point in a sensor-uninstalled segment, the traffic volume measured by a downstream sensor in the vicinity of the traffic congestion starting point (also, referred to as the downstream side sensor) cannot be used as is. This is because the ratio of vehicles departing from the traffic congestion starting point (departing rate) is different according to the distance from the traffic congestion starting point to the downstream sensor-installed point. As such, the inflow and outflow estimating unit 106 estimates the outflow from the traffic congestion starting point at time t (the number of departing vehicles per unit time) by the equation (3).

$$q'_{out,t} = q_{out,t} \times (\Delta t - d_{down,t-1}/v)/\Delta t + q_{resid,t} \quad (3)$$

wherein $q'_{out,t}$ indicates the outflow from the traffic congestion starting point at time t (the number of departing vehicles per unit time), $q_{out,t}$ indicates a traffic volume measured by the downstream sensor at time t (the number of vehicles passing through the sensor per unit time), $d_{down,t-1}$ indicates a distance from the traffic congestion starting point to the downstream sensor at time t−1, $d_{down,t-1}$/v indicates required time for a vehicle departing from the traffic congestion starting point at time t−1 to reach the downstream sensor, v is the average speed of GPS equipped vehicles that have traveled from the traffic congestion starting point to the downstream sensor, and Δt indicates a measurement time width of the downstream sensor.

The first term of the equation (3) estimates the departing traffic volume of vehicles departing from the traffic congestion starting point (the number of departing vehicles per unit time) by multiplying the traffic volume measured by the downstream sensor at time t (the number of vehicles passing through the sensor per unit time) by the departing rate of vehicles departing from the traffic congestion starting point.

The second term of the above-described equation (3), $q_{resid,t}$, represents the traffic volume of vehicles that departed the traffic congestion starting point at time t and were measured by the downstream sensor after time t (the number of vehicles passing through the sensor per unit time).

Moreover, $q_{resid,t}$ of the equation (3) is calculated by the following equation:

$$q_{resid,t} = \sum_i \left\{ (q_{out,t+i} - q'_{out,t+i}) \frac{i \times \Delta t - d_{down,t+i}/v}{i \times \Delta t} \right\} \quad (4)$$

$q_{out,t+i} - q'_{out,t+i}$ of the equation (4) indicates the residual number of vehicles remaining in an uncongested area at time step t+i.

The next term indicates the ratio of vehicles that can arrive at the downstream sensor at time t+1 among vehicles departing to the uncongested area at time that is i passed from time t. The value obtained by multiplying this term by the above-described residual number of vehicles is a departing residual traffic volume. The denominator indicates a time width available for vehicles remaining in the uncongested area, and the numerator indicates time obtained by subtracting the average time that the vehicles take for passing through the downstream sensor from the available time width.

The inflow and outflow estimating unit 106 estimates the number of departing vehicles per unit time, which is the number of vehicles departing from the traffic congestion starting point at every time period, as the outflow from the traffic congestion starting point by the equations (3) and (4). The inflow and outflow estimating unit 106 causes the storage device (not illustrated) to store the estimated inflow to the traffic congestion end point.

The processing of updating the traffic congestion end point and congestion starting point of the initial traffic congestion area by the traffic congestion area updating unit 107 (step S204) will be described below.

The traffic congestion area updating unit 107 updates the traffic congestion end point of the initial traffic congestion area, based on the inflow estimated by the inflow and outflow estimating unit 106, and updates the traffic congestion starting point of the initial traffic congestion area, based on the estimated outflow. Specifically, the traffic congestion area updating unit 107 can calculate the extension of the traffic congestion length per unit time respectively at congestion end point and congestion starting point by calculating an increase/decrease in the number of arriving vehicles and the number of departing vehicles per lane by dividing the number of arriving vehicles and the number of departing vehicles per unit time by the number of lanes and multiplying theses values by the average vehicle length+average inter-vehicular distance.

Further, the traffic congestion area updating unit 107 estimates a change over time in the initial traffic congestion area, based on a difference between the inflow and outflow estimated by the inflow and outflow estimating unit 106. Specifically, the traffic congestion area updating unit 107 calculates a difference between the number of arriving vehicles and the number of departing vehicles per unit time. This difference is divided by the number of lanes to calculate the increase/decrease in the number of residual vehicles per lane, and the extension of the traffic congestion length of the initial traffic congestion area can be calculated by multiplying the increase/decrease in the number of residual vehicles per lane by the average vehicle length+average inter-vehicular distance.

Figure 6:
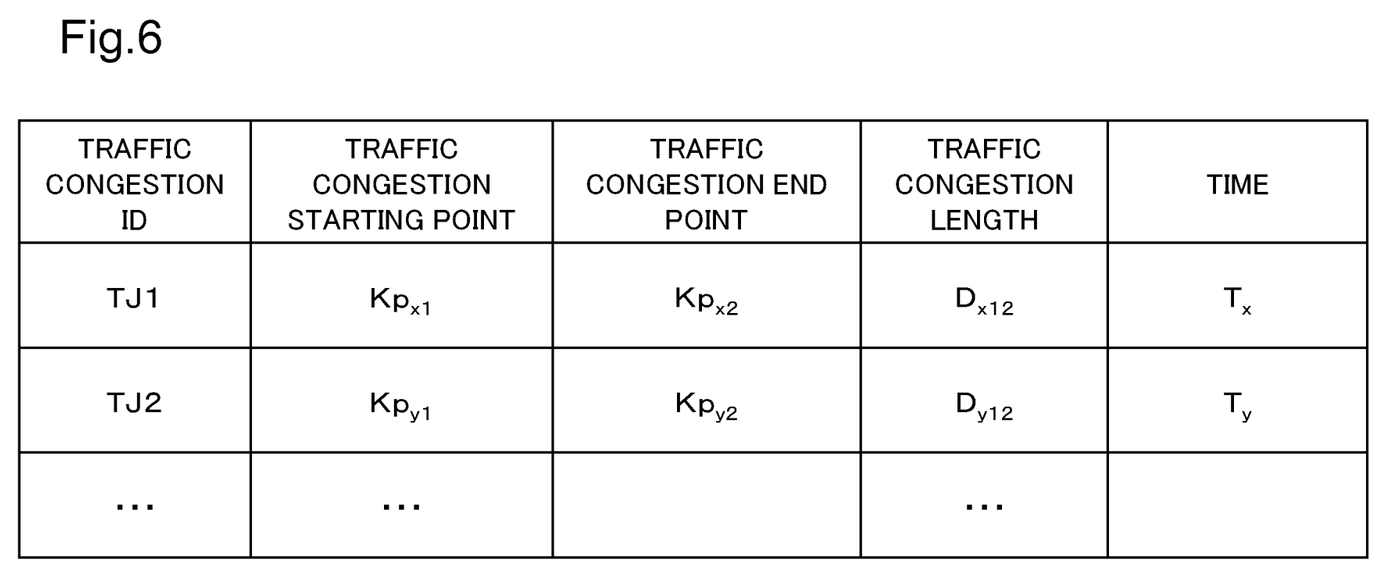
FIG. 6 is a datasheet illustrating an example of traffic congestion information of the first example embodiment.

The traffic congestion estimating device 100 stores the traffic congestion area calculated in this way in the traffic congestion information storage unit 108. FIG. 6 is a datasheet indicating an example of traffic congestion information. The traffic congestion information illustrated in FIG. 6 includes a traffic congestion ID, a traffic congestion starting point, a traffic congestion end point, a traffic congestion length, and time. The traffic congestion ID is an identifier for identifying traffic congestion. The traffic congestion starting point is a starting position of traffic congestion in the traffic congestion area of traffic congestion ID. The traffic congestion end point is an end position of traffic congestion in the traffic congestion area of traffic congestion ID. The traffic congestion length is the length of the traffic congestion area that is defined by the traffic congestion starting point and the traffic congestion end point. The time is time when the traffic congestion length was estimated.

For example, when the road is a highway, the traffic congestion estimating device 100 may cause the traffic congestion information storage unit 108 to store the traffic congestion starting point and the traffic congestion end point as information of "kilometer markers" that are installed along the highway.

The information providing unit 109 acquires a traffic congestion area updated by the traffic congestion information storage unit 108 and provides it to a user.

According to the present embodiment, precision of identifying the starting point and end point of a traffic congestion segment can be improved even in a sensor-uninstalled segment. This is because: the traffic congestion starting point and end point identifying unit of the traffic congestion estimating device identifies the traffic congestion end point and congestion starting point for defining a traffic congestion area, based on the position information detected for each vehicle; further, the inflow and outflow estimating unit estimates an inflow to the traffic congestion end point at every time period, as well as, an outflow from the traffic congestion starting point at every time period, based on the traffic volume that was measured by a sensor on the upstream side of the traffic congestion end point and the traffic volume that was measured by a sensor on the downstream side of the traffic congestion starting point and the position information; and the inflow and outflow estimating unit updates the traffic congestion end point based on the estimated inflow and updates the traffic congestion starting point based on the estimated outflow.

The road according to the above-described embodiment is applicable to roads of highways or in mountains.

Note that the GPS information stored in the GPS information storage unit 102 is not limited to be acquired based on GPS observation results, as long as the GPS information is a driving history indicating which time band and which segment a vehicle was travelling in. For example, the result of tracing a vehicle using the MAC (Media Access Control) address of an in-vehicle device may be acquired, information input in a communication terminal by a user may be acquired, or information indicating a position and time may be acquired from a user in one way or another.

(Hardware Configuration)

Figure 7:
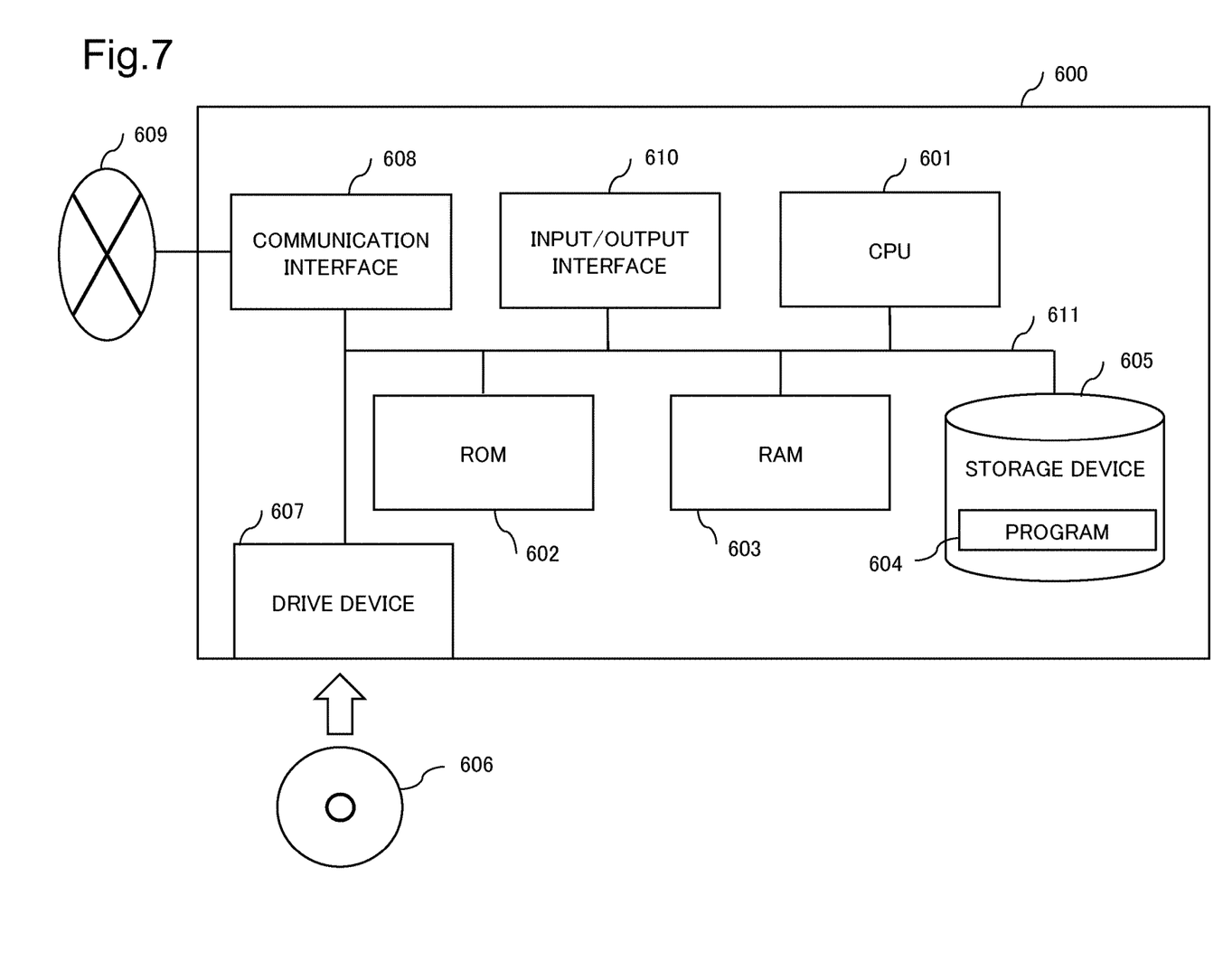
FIG. 7 is a block view illustrating a hardware configuration where a traffic congestion estimating device and the like of the first example embodiment is realized by a computer.

FIG. 7 is a diagram illustrating a hardware configuration where a traffic congestion estimating device of the first example embodiment is realized by a computer. Each component of the traffic congestion estimating device of the first example embodiment indicates a functional block. A part or whole of each component is implemented by, for example, an arbitrary combination of the computer 600 and a program as illustrated in FIG. 7. The computer 600 includes the following configuration as an example:

a CPU (Central Processing Unit) 601;
a ROM (Read Only Memory) 602;
a RAM (Random Access Memory) 603;
a program 604 to be loaded on the RAM 603;
a storage device 605 that stores the program 604; a drive device 607 that writes to and reads from a recording medium 606;
a communication interface 608 connected to a communication network 609;
an input/output interface 610 that inputs/outputs data; and
a bus 611 that connects the components.

The components of the traffic congestion estimating device are implemented when the CPU 601 acquires and executes the program 604 that realizes the functions the components. The program 604 that realizes the functions of the components is, for example, stored in advance in the storage device 605 or RAM 603 and is retrieved by the CPU 601 as necessary. Note that the program 604 may be supplied to the CPU 601 through the communication network 609, or the program 604 may be stored in advance in the recording medium 606 and the drive device 607 may read the program and supply it to the CPU 601.

The implementation method of the traffic congestion estimating device includes a variety of modifications. For example, each component of the traffic congestion estimating device may be implemented by an arbitrary combination of a separate computer 600 and a program. Alternatively, a plurality of components of the traffic congestion estimating device may be implemented by an arbitrary combination of a single computer 600 and a program.

Further, a part or whole of each component of the traffic congestion estimating device is implemented by other general-purpose or dedicated circuit, processor, etc. or a combination thereof. The part or whole of each component of the traffic congestion estimating device may be configured by a single chip or by a plurality of chips connected through a bus. Alternatively, instead of a computer 600, a programmable logic device such as a field-programmable gate array (FPGA) may be used.

Further, a part or whole of each component of the traffic congestion estimating device may be implemented by a combination of the above-described circuit, etc. and the program.

When a part or whole of each component of the traffic congestion estimating device is implemented by a plurality of computers, circuits, etc., the plurality of computers, circuits, etc., may be centrally arranged or distributedly arranged. For example, the computers, circuits, etc. may be implemented in a mode where the computers, circuits, etc. are connected through a communication network, such as a client server system and a cloud computing system.

The claimed invention has been described so far with reference to the above-described embodiments, without limitation thereto. A variety of modifications that will be understood by those skilled in the art can be made to the configuration and details of the claimed invention within the scope thereof.

The directions of arrows in the drawings illustrate examples without limiting the orientations of signals between blocks.

REFERENCE SIGNS LIST

100 Traffic congestion estimating device
101 Information collecting unit
102 GPS information storage unit
103 Sensor information storage unit
104 Road information storage unit
105 Traffic congestion starting point and end point identifying unit
106 Inflow and outflow estimating unit
107 Traffic congestion area updating unit
108 Traffic congestion information storage unit
109 Information providing unit
600 Computer
601 CPU
602 ROM (Read Only Memory)
603 RAM
604 Program
605 Storage device
606 Recording medium
607 Drive device
608 Communication interface
609 Communication network
610 Input/output interface
611 Bus

The invention claimed is:

1. A traffic congestion estimating device comprising:
a memory configured to store instructions; and
at least one processor configured to execute the instructions to:
identify a traffic congestion end point and a traffic congestion starting point for defining a traffic congestion area, based on position information detected for each vehicle;
estimate an inflow to the traffic congestion end point at every time period, as well as, an outflow from the traffic congestion starting point at that time period, based on a traffic volume that was measured by a sensor on an upstream side of the traffic congestion end point, a traffic volume that was measured by a sensor on a downstream side of the traffic congestion starting point, and the position information; and
update the traffic congestion end point, based on the inflow, and update the traffic congestion starting point, based on the outflow,
wherein the inflow is calculated based on an arrival inflow, which is calculated based on a traffic volume that was measured by the upstream-side sensor and an arrival rate indicating a ratio in which vehicles passing through the upstream-side sensor arrive at the traffic congestion end point, and a residual traffic volume that arrives at the traffic congestion end point at a certain time period among the traffic volume that was measured by the upstream-side sensor prior to the certain time period.

2. The traffic congestion estimating device according to claim 1, wherein
the at least one processor configured to execute the instructions to:
calculate the residual traffic volume, based on the number of vehicles remaining between the upstream-side sensor and the traffic congestion end point prior to the certain time period and a ratio of vehicles that can arrive at the traffic congestion end point at the certain time period.

3. The traffic congestion estimating device according to claim 1, wherein
the at least one processor configured to execute the instructions to:
calculate a departing traffic volume, based on a traffic volume measured by the downstream-side sensor and a departing rate that indicates a ratio of vehicles departing from the traffic congestion starting point, and
calculate the outflow, based on the departing traffic volume and a departing residual traffic volume that departs the traffic congestion starting point at a certain time period and arrives at the downstream-side sensor after the certain time period.

4. The traffic congestion estimating device according to claim 3, wherein
the at least one processor configured to execute the instructions to:
calculate the departing residual traffic volume, based on the number of residual vehicles that remain between the traffic congestion starting point and the downstream-side sensor after the certain time period and a ratio of vehicles arriving at the downstream-side sensor after the certain time period.

5. The traffic congestion estimating device according to claim 1, wherein
the at least one processor configured to execute the instructions to:
identify the traffic congestion end point and the traffic congestion starting point by calculating the average speed or traffic density of the vehicles, based on the position information.

6. The traffic congestion estimating device according to claim 1, wherein
the at least one processor configured to execute the instructions to:
update extension of the traffic congestion area, based on a difference between the inflow and the outflow.

7. A traffic congestion estimating method comprising:
identifying a traffic congestion end point and a traffic congestion starting point for defining a traffic congestion area, based on position information detected for each vehicle;
estimating an inflow to the traffic congestion end point at every time period, as well as, an outflow from the traffic congestion starting point at that time period, based on a traffic volume that was measured by a sensor on an upstream side of the traffic congestion end point, a traffic volume that was measured by a sensor on a downstream side of the traffic congestion starting point, and the position information, and
updating the traffic congestion end point, based on the inflow, and updating the traffic congestion starting point, based on the outflow,
wherein the inflow is calculated based on an arrival inflow, which is calculated based on a traffic volume that was measured by the upstream-side sensor and an arrival rate indicating a ratio in which vehicles passing through the upstream-side sensor arrive at the traffic congestion end point, and a residual traffic volume that arrives at the traffic congestion end point at a certain time period among the traffic volume that was measured by the upstream-side sensor prior to the certain time period.

8. A non-transitory computer readable recording medium that stores a program for causing a computer to execute:
identifying a traffic congestion end point and a traffic congestion starting point for defining a traffic congestion area, based on position information that was detected for each vehicle;
estimating an inflow to the traffic congestion end point at every time period, as well as, an outflow from the traffic congestion starting point at that time period, based on a traffic volume that was measured by a sensor on an upstream side of the traffic congestion end point, a traffic volume that was measured by a sensor on a downstream side of the traffic congestion starting point, and the position information, and
updating the traffic congestion end point, based on the inflow, and updating the traffic congestion starting point, based on the outflow,
wherein the inflow is calculated based on an arrival inflow, which is calculated based on a traffic volume that was measured by the upstream-side sensor and an arrival rate indicating a ratio in which vehicles passing through the upstream-side sensor arrive at the traffic congestion end point, and a residual traffic volume that arrives at the traffic congestion end point at a certain time period among the traffic volume that was measured by the upstream-side sensor prior to the certain time period.

* * * * *